United States Patent [19]

Herchenbach et al.

[11] Patent Number: 4,530,661
[45] Date of Patent: Jul. 23, 1985

[54] APPARATUS FOR THE CALCINATION OF FINE GRAINED MATERIAL

[75] Inventors: Horst Herchenbach, Hennef; Andris Abelitis, Rösrath, both of Fed. Rep. of Germany

[73] Assignee: Klöckner-Humboldt-Deutz AG, Fed. Rep. of Germany

[21] Appl. No.: 650,658

[22] Filed: Sep. 14, 1984

[30] Foreign Application Priority Data

Sep. 17, 1983 [DE] Fed. Rep. of Germany ....... 3333718

[51] Int. Cl.³ .............................................. F27B 7/02
[52] U.S. Cl. ...................................... 432/106; 432/58
[58] Field of Search ........................... 432/106, 58, 14

[56] References Cited

U.S. PATENT DOCUMENTS

| | | | |
|---|---|---|---|
| 3,881,861 | 5/1975 | Ritzman | 432/106 |
| 3,986,818 | 10/1976 | Deussner et al. | 432/14 |
| 4,028,049 | 6/1977 | Naudy et al. | 432/106 |
| 4,108,593 | 8/1978 | Christiansen | 432/106 |
| 4,201,546 | 5/1980 | Herchenbach et al. | 432/106 |
| 4,218,210 | 8/1980 | Herchenbach et al. | 432/58 |
| 4,257,766 | 3/1981 | Ritzmann | 432/58 |
| 4,425,092 | 1/1984 | Brachthausaer et al. | 432/58 |

Primary Examiner—Henry C. Yuen
Attorney, Agent, or Firm—Hill, Van Santen, Steadman & Simpson

[57] ABSTRACT

An apparatus for the calcination of fine grained material, particularly material used to produce cement clinker employing at least two separate, essentially parallel preheater lines, one of which is treated with exhaust gases from a clinker-forming zone and the other is equipped with a calcination zone which itself is fed by hot combustion air from the clinker cooler. In the area of the preheater line which is attached to the exhaust gas conduit of the clinker-forming zone, a divider device is arranged for dividing the stream of material. A first conduit directs a portion of the material into the exhaust gas conduit of the clinker-forming zone and a second conduit directs material into the calcination zone. The calcination zone is in the form of a vertical reaction duct having a downwardly bent pipe at its upper end. There is also provided a conduit which connects the vertical reaction duct with the exhaust means for hot gases in the clinker-forming zone.

7 Claims, 1 Drawing Figure

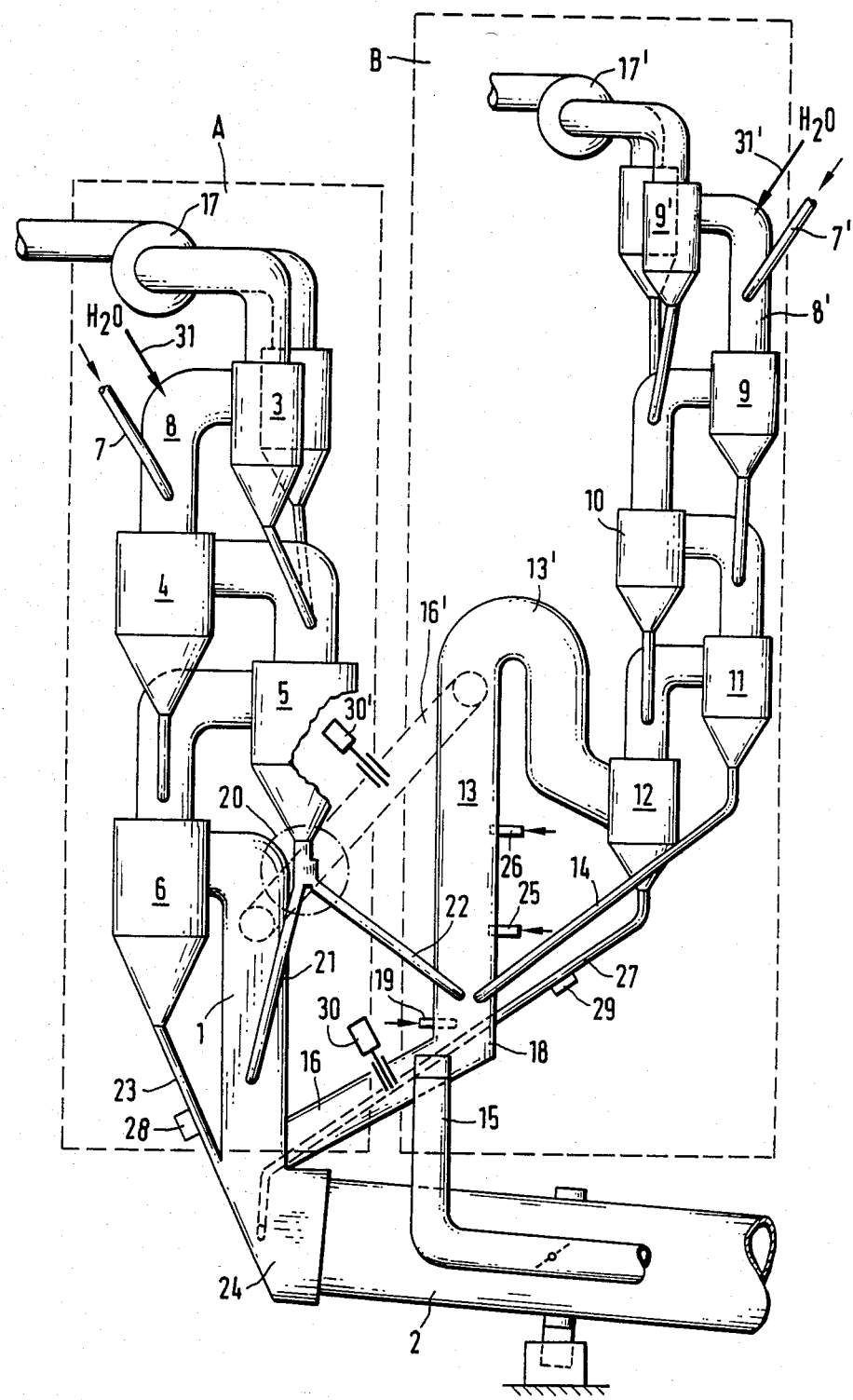

APPARATUS FOR THE CALCINATION OF FINE GRAINED MATERIAL

BACKGROUND OF THE INVENTION

1. Field of the Invention

The present invention is in the field of calcination of fine grained material, particularly of the type used for cement clinker, utilizing two essentially parallel preheater lines, with means being provided to more efficiently divide the distribution of material between the lines and providing more efficient control of the agglomeration and calcination behavior of the meal being processed.

2. Description of the Prior Art

This invention is an improvement of the subject matter described in U.S. Ser. No. 635,894, filed July 30, 1984, and based upon German patent application No. P 33 27 576.9, filed July 30, 1983.

As explained in the prior application, the provision of essentially parallel product streams utilizing separate preheating lines is known to the prior art. For example, there is shown an apparatus for performing this method in the article "Experience With Pre-Calcining Taking Into Account Substitute Fuels" appearing in the Journal "Zement-Kalk-Gips", No. 5, 1979, page 218, picture 12. In the apparatus illustrated in this article, cooler exhaust air and furnace exhaust air are utilized in two separate preheating lines. A calcinator line containing four cyclone stages is followed by a calcinator to which combustion air from the cooler is supplied. A parallel furnace line includes a conventional four-stage cyclone preheater. The meal is distributed between the preheater lines approximately proportionately to the gas quantities. For example, one calcinator line receives approximately 62% and the other about 38% of the meal. In the calcinator, the meal streams from the fourth stage of the furnace line and the third stage of the calcinator line flow together. Beneath the meal inlet a sufficient amount of heating oil is blasted in such that approximately 90% deacidification is obtained. Exhaust gas and deacidified meal are drawn off from the calcinator, subsequently directed into the fourth cyclone stage of the calcinator line, and then separated from one another therein. There is an advantage in this type of construction in that the separate gas guidance permits the separate regulation of two preheater lines and permits variation of performance within a greater range.

In the improved form of this type of apparatus described in the aforementioned copending application based on German patent application No. P 33 27 576.9, the material is thermally treated in a preheating zone into separate, essentially parallel streams and then is calcined in a clinker-forming zone. One of the preheater lines is connected to the exhaust gas conduit of the clinker-forming zone and the other preheater line is contacted with a stream of reaction gas from the calcination zone which in turn is charged with hot exhaust air from the cooler zone together with fuel. The stream of material preheated in the exhaust air of the clinker-forming zone is divided in the area of the preheating zone into two partial streams one of which is conveyed back into the stream of exhaust gas of the clinker-forming zone and the other partial stream is introduced into the calcination zone.

In the methods and apparatus of the type mentioned previously, cooler exhaust air and kiln exhaust gas are converted into two separate preheater lines one of which contains a calcinator connected in series with the cyclone heat exchanger stages in the direction of flow of the material, to which there is conveyed combustion air from the cooler, together with preheated powder and fuel. In this type of system there is usually a four-stage cyclone preheater attached to the exhaust gas conduit from the clinker kiln. A crude powder is allocated somewhat proportionately to the quantities of gas passing through the various apparatus whereby, for example, the calcinator line may contain approximately 60% and the kiln or furnace line contain about 40% of the quantity of powder being treated. The methods and apparatus of this type according to the present state of the art are in most cases so disposed and operated that in the calcinator, streams of powder flow together out of both preheating lines. In the area of the powder inlet, fuel is added to the calcinator in such quantity that almost 80 to 90% deacidification is achieved. Exhaust gas and deacidified powder are separated in a separation stage in series with the calcinator, and the calcined material is conveyed into the inlet of the rotary kiln for clinker production. An advantage of this type of construction resides in the fact that both preheating lines may be regulated separately and the yield may be altered over a greater range.

There was a difficulty found, however, in attempting to synchronize the rate of precalcination of both lines in an optimal manner. The difficulty occurred in that in the preheating line connected to the exhaust gas of the clinker-forming reactor, a dust circuit developed wherein portions of dust-type materials were introduced which were completely deacidified. Such portions of material passing from the preheating line into the calcination zone possessed a higher degree of deacidification than portions of the material exiting from the calcinator. For the prevention of over-calcination and the disadvantage of caking in the calcination zone, the addition of fuel in the calcination zone could not be undertaken at a level which would be necessary for deacidification as far as possible of all material parts which would be thermally pretreated in the preheating line acted on by the air from the cooler.

The difficulty would be particularly pronounced with installations which were originally laid out with only one preheating line and by means of subsequent addition, a second preheating line was added with a calcination device to substantially increase the yield.

In the prior application these mentioned difficulties were overcome by adapting the rate of precalcination of both lines optimally to one another. Consequently, methods and installations of the type mentioned were far improved and developed that prevention of over-calcination and/or formations of deposits were essentially prevented, and a substantially uniform degree of deacidification was achieved in the materials which were pretreated and precalcined in both the parallel preheating lines before their introduction into the clinker-forming reactor.

Another advantage was that the increase in the degree of deacidification in the preheater line fed by the stream of exhaust gas from the clinker reactor was achieved without the necessity of adding fuel, whereby the danger of a CO emission in the exhaust gas was prevented.

SUMMARY OF THE INVENTION

The present invention is intended to improve still further the installation according to the prior copending U.S. application based on German patent application No. P 33 27 576.9 in order to particularly overcome difficulties still existing, and obtain a fargoing flexible adaptation of the manner of operation in differentiating deacidification behavior of the crude powder in each case according to the fineness and agglomeration behavior.

The present invention provides a solution to this problem by providing a calcination reaction zone which is in the form of a vertical reaction duct having a looped pipe curved from its upper portion thereof in the direction of gas flow, and a conduit which interconnects the calcination zone with the exhaust gas conduit from the clinker-forming zone. With this arrangement, there results the advantage that the suspended partial stream branched off into the conduit causes a longer duration of entrainment of the particles of powder. Consequently, the degree of calcination of this portion is increased. On the other hand, the separating cyclone which is downstream of the branching off portion of the pipe is relieved and consequently both the degree of effectiveness of the separation is improved as well as the drops in temperature which are slightly increased in the heat exchange cyclone which is connected in series.

Furthermore, there is an equalization of the streams of gas in both parallel preheater lines. The exhaust gas blowers are thereby compensated with one another and the manufacturing and operational maintenance costs are lowered. Finally, the conduit by equalizing the streams of quantities of gas in both preheater lines makes possible a more delicately sensitive adaptation of the combustion process to differing deacidification behavior of the crude powder in each case depending upon its fineness and agglomeration behavior.

Further, an additional improvement is provided in that the connection conduit is arranged between the kiln inlet housing and the lower end of the calcination reaction duct, and is equipped with a governor or adjustable throttling valve. In the case of very small concentrations of harmful substances in the kiln or furnace gas, this conduit provides an advantageous equalization of quantity, temperature and composition of the parallel gas streams. In the preferred form of the invention, the preheater coil in which the reaction duct is arranged is constructed with five preheater cyclones connected in series. Through the five heat exchanger cyclones, the temperature in the exhaust gas is lowered by about 50° to 60° C. so that the exhaust gas temperatures of the two preheater lines are almost equal. Finally, there is a further advantage by providing for injection of water into the two uppermost heat exchanger cyclones. With these water injections, the exhaust gas before entering the electrofilters is conditioned in series.

BRIEF DESCRIPTION OF THE DRAWING

The single FIGURE in the drawing illustrates rather schematically an installation for the heat treatment of fine grained material according to the present invention.

DESCRIPTION OF THE PREFERRED EMBODIMENTS

The apparatus shown in the drawing consists of two parallel suspension gas heat exchanger lines A and B. Heat exchanger line A is connected to an exhaust gas conduit 1 of a rotary kiln 2 which serves as the clinker-forming zone. Heat exchanger line A consists of four cyclone stages 3, 4, 5 and 6. The uppermost cyclone stage 3 is constructed as a double cyclone separator to which an exhaust gas blower 17 is connected in series. An inlet device 7 serves to deliver crude powder into a gas conduit 8 leading from the cyclone stage 4 into the next succeeding cyclone stage 3.

Heat exchanger line B contains cyclone stages 9', 9, 10, 11 and 12. The uppermost cyclone stage 9' is likewise constructed as a double cyclone separator and has an exhaust gas blower 17' connected in series. A supply of raw or crude material takes place through a material inlet device 7' in a gas conduit 8' leading from the cyclone stage 9 to the cyclone stage 9'. The lowermost cyclone stage 12 is connected in series on the gas side with a calcination zone which is constructed as a vertical reaction duct 13 with a pipe bend 13' curved downwardly at its upper part. The reaction duct 13 has an inlet end 18 in the direction of flow of material which is connected with a tertiary air conduit 15 through which hot, dust-laden cooler exhaust air blows from a clinker cooler not specifically shown in the drawing into the reaction duct 13.

Additionally, a conduit 16 may be provided for connection of the reaction duct 13 with the exhaust gas conduit 1 of the rotary kiln 2. The conduit 16 is equipped with a regulatable resistance in the form of a governor or a throttle valve 30. Particularly in the case of a specially low harmful substance content, calcination gas may be transferred over into the lower part of the reaction duct 13 through this means, so that the gas content between the two preheater lines A and B is equalized and the temperature of the reaction gas increased.

In the case of higher proportions of harmful substances in the exhaust gas from the rotary kiln 2, a connection conduit 16' provides for equalization of the streams of quantities of gas. The discharge of the conduit 16' in the end area of the rotary kiln 2 is therefore advantageous with higher contents of harmful substances in the kiln gas from the rotary kiln because in this area a negative influence of the deacidification reaction through the harmful substance can no longer be effective.

The conduit 16' branches out of the exhaust gas conduit 1 between the rotary kiln 2 and the lowermost heat exchanger cyclone 6 of the preheater line A above the discharge point for the powder supply conduit 21. For the purpose of equalization of the conduit resistance and regulation of predetermined streams of quantities of gas, the conduit 16' is provided with a governor or throttle valve 30'. A material conduit 14 leading out of the separator cyclone stage 11 discharges into the lower area 18 of the reaction duct 13. Directly in the area of this discharge there is provided a device 19 for feeding fuel. Beneath the next to the last cyclone separator stage 5 of the heat exchanger line A there is arranged a material switch 20 from which two material conduits 21 and 22 branch off. The latter receive the portions of material from the material switch 20 in the form of partial streams. The material conduit 21 introduces one of the partial streams from the material switch 20 into the exhaust gas conduit 1, wherein the material received from the exhaust gas conduit of the rotary kiln 51 is disintegrated into a cloud of flue dust and is precalcined in direct heat exchange with the gas. This precalcined material is separated off in the lowermost cyclone separator stage 6 from the current of gas and introduced into the inlet chamber 24 of the rotary kiln 2. The material conduit 22 likewise branching off from the material switch 20 discharges into the lower area 18 of the reaction duct 13 preferably opposite to the entry point of the material conduit 14. The portions of material which are fed by means of conduits 22 and 14 into the reaction zone of the rotary kiln 2 are whirled in the stream of gas consisting predominantly of tertiary air together with fuel from the fuel-charging device 19, and brought in suspension with fuel and gas to reaction. At temperatures in the area of about 900° C. the deacidification operation is carried out. According to the amount of added fuel, the material inlet temperature, the duration, and the $CO_2$ partial pressure, a predetermined degree of deacidification at a reaction time of approximately 2 to 4 seconds is achieved.

In each of the pipe conduits 8 or 8' connecting the two uppermost heat exchanger cyclones 3 and 4 of the preheater line A or 9 and 9' of the preheater line B, respectively, connecting the pipe conduit parts 8 or 8', respectively, downstream of the material inlet points 7, 7' or at the same level in each case, a device 31, 31' may be arranged for injection of water. Through the use of water injection, if necessary, the exhaust gas temperature can be lowered and the gas condition for better separation in a succeeding electrofilter connected in series, and not shown in the drawing.

As explained in the previously filed copending application, there are considerable advantages resulting from this type of apparatus, including elimination of the danger of overheating and baking on in the calcination zone. Because an addition of fuel in the line A can be eliminated with this invention, the danger of excessive carbon monoxide components in the exhaust gas is avoided. There is a major additional advantage in that there is a simplified regulation of the deacidification degree necessary for each line.

Through the present improvements, particularly in regard to technical regulation, there is a more flexible adaptation of the parameters of the installation to differing qualities of crude powder, for example, the agglomeration and calcination behavior and thereby an optimal manner of operation is made possible.

At the same time, the arrangement provides a connection conduit 16' with a better controllability of the streams of gas put through from the parallel preheater lines A and B as to quantity, temperature and composition. Consequently, an equalization of the yield of the exhaust gas blower 17 and 17' is effected with the advantage that there is a further lowering of costs for investment and provision for replacement parts.

By means of the longer duration of the branched-off suspension partial stream in the connection conduit 16', the solid portion supplied therein receives a higher degree of calcination and the cyclone stage 6 of the heat exchanger line A is at least partially relieved.

It should be evident that various modifications can be made to the described embodiments without departing from the scope of the present invention.

We claim as our invention:

1. An apparatus for the calcination of fine grained material, particularly cement clinker, comprising:
    two essentially parallel preheater lines for preheating portions of the meal to be calcined,
    a clinker-forming zone having an exhaust means for hot gases,
    means for directing hot gases from said clinker-forming zone into the first of said preheater lines,
    a calcination zone receiving preheated meal from the second of said preheater lines,
    means for delivering hot combustion air from a cooler into said calcination zone,
    divider means in said first preheater line delivering a portion of the preheated meal to said exhaust means of said clinker-forming zone and another portion/to said calcination zone,
    said calcination zone being in the form of a vertical, reaction duct having a downwardly curved upper portion, and
    conduit means connecting said vertical react:on duct with said exhaust means for hot gases in said clinker-forming zone.

2. An apparatus according to claim 1 wherein: said conduit means is positioned in said exhaust means above the point of introduction of meal from said divider means into said exhaust means.

3. An apparatus according to claim 1 which includes an adjustable throttling means in said conduit means.

4. An apparatus according to claim 1 which includes an additional connection conduit extending between the inlet to said clinker-formrng zone and the lower end of the calcinator 5. An apparatus according to claim 4 which includes an adjustable throttling means in said connection conduit.

6. An apparatus according to claim 1 in which the second of said preheater lines contains five heat exchanger cyclones connected in series.

7. An apparatus according to claim 1 in which each of said lines consists of heat exchanger cyclones connected in series, and
    water injection means arranged to inject water into the uppermost of each heat exchanger cyclone in each preheater line.

* * * * *